United States Patent
Zhang et al.

(10) Patent No.: US 11,899,711 B2
(45) Date of Patent: Feb. 13, 2024

(54) MERCHANT LOGO DETECTION ARTIFICIAL INTELLIGENCE (AI) FOR INJECTING USER CONTROL TO ISO BACK-END TRANSACTION APPROVALS BETWEEN ACQUIRER PROCESSORS AND ISSUER PROCESSORS OVER DATA COMMUNICATION NETWORKS

(71) Applicant: ONDOT SYSTEMS INC., San Jose, CA (US)

(72) Inventors: Zhiqiang Zhang, San Ramon, CA (US); Vaduvur Bharghavan, Morgan Hill, CA (US); Qi Chen, San Jose, CA (US); Zhiling Liu, Sunnyvale, CA (US); Kun Qian, Stanford, CA (US)

(73) Assignee: ONDOT SYSTEMS INC., San Jose, CA (US)

( * ) Notice: Subject to any disclaimer, the term of this patent is extended or adjusted under 35 U.S.C. 154(b) by 537 days.

(21) Appl. No.: 17/121,544

(22) Filed: Dec. 14, 2020

(65) Prior Publication Data
US 2021/0165823 A1    Jun. 3, 2021

Related U.S. Application Data

(63) Continuation-in-part of application No. 16/551,166, filed on Aug. 26, 2019, now abandoned, which is a
(Continued)

(51) Int. Cl.
*G06F 16/58* (2019.01)
*G06N 3/04* (2023.01)
(Continued)

(52) U.S. Cl.
CPC ........ *G06F 16/5866* (2019.01); *G06F 16/532* (2019.01); *G06F 16/583* (2019.01); *G06N 3/04* (2013.01); *G06Q 20/388* (2013.01)

(58) Field of Classification Search
CPC ......... G06F 18/24; G06F 3/00; G06V 10/945; G06V 3/044; G06N 3/08
See application file for complete search history.

(56) References Cited

U.S. PATENT DOCUMENTS

| 5,708,422 A | 1/1998 | Blonder et al. |
| 5,884,289 A | 3/1999 | Anderson et al. |

(Continued)

FOREIGN PATENT DOCUMENTS

| DE | 20 2012 013 375 U1 | 9/2016 |
| EP | 2 869 255 A1 | 5/2015 |
| WO | WO-2013/062897 A1 | 5/2013 |

OTHER PUBLICATIONS

Anonymous, "Detecting fraud using information on account holder collected outside the operation of the account," ip.com Disclosure No. IPCOM000035207D, 2005, https://priorart.ip.com/IPCOM/000035207 (Year: 2005).

(Continued)

*Primary Examiner* — Yosef Kassa
(74) *Attorney, Agent, or Firm* — FOLEY & LARDNER LLP

(57) ABSTRACT

Logo candidates for a specific ISO data can be identified from external resources based on the enriched merchant data. Low quality images of the logo candidates are filtered out with image analysis including entropy ratio evaluations of the logo candidates. Also, the logo candidates are processed with high quality filtering including classification of the logo candidates with a deep learning classifier for distinguishing logos from non-logos. A logo from the logo candidates is selected to associate with the ISO data packets. A display having the selected logo associated with a transaction of the ISO data packets can be generated for display to users.

10 Claims, 13 Drawing Sheets

Related U.S. Application Data continuation-in-part of application No. 16/227,560, filed on Dec. 20, 2018, now abandoned, which is a continuation-in-part of application No. 14/058,229, filed on Oct. 19, 2013, now abandoned, which is a continuation-in-part of application No. 13/527,544, filed on Jun. 19, 2012, now abandoned.

(51) Int. Cl.
*G06Q 20/38* (2012.01)
*G06F 16/583* (2019.01)
*G06F 16/532* (2019.01)

(56) References Cited

U.S. PATENT DOCUMENTS

| | | |
|---|---|---|
| 5,892,900 A | 4/1999 | Ginter et al. |
| 5,953,710 A | 9/1999 | Fleming |
| 6,029,154 A | 2/2000 | Pettitt |
| 6,122,624 A | 9/2000 | Tetro et al. |
| 6,343,279 B1 | 1/2002 | Bissonette et al. |
| 6,422,462 B1 | 7/2002 | Cohen |
| 6,516,056 B1 | 2/2003 | Justice et al. |
| 6,658,568 B1 | 12/2003 | Ginter et al. |
| 7,266,537 B2 | 9/2007 | Jacobsen et al. |
| 7,427,033 B1 | 9/2008 | Roskind |
| 7,693,771 B1 | 4/2010 | Zimmerman et al. |
| 7,784,684 B2 | 8/2010 | Labrou et al. |
| 7,793,851 B2 | 9/2010 | Mullen |
| 7,798,416 B2 | 9/2010 | Roskind |
| 7,801,826 B2 | 9/2010 | Labrou et al. |
| 7,813,725 B2 | 10/2010 | Celik |
| 7,813,822 B1 * | 10/2010 | Hoffberg .............. H04N 7/163 |
| | | 381/73.1 |
| 7,822,688 B2 | 10/2010 | Labrou et al. |
| 7,828,220 B2 | 11/2010 | Mullen |
| 7,925,605 B1 * | 4/2011 | Rubin .................. G06N 5/025 |
| | | 706/47 |
| 8,127,982 B1 | 3/2012 | Casey et al. |
| 8,284,061 B1 * | 10/2012 | Dione ............... G06Q 30/0269 |
| | | 705/26.1 |
| 8,417,630 B2 | 4/2013 | Wolfson et al. |
| 8,509,734 B1 | 8/2013 | Gupta et al. |
| 8,516,266 B2 * | 8/2013 | Hoffberg ............. G05B 15/02 |
| | | 715/239 |
| 8,706,620 B2 | 4/2014 | Ciurea |
| 9,324,105 B2 | 4/2016 | Kopikare et al. |
| 9,674,154 B1 | 6/2017 | Canavor et al. |
| 9,704,185 B2 * | 7/2017 | Cunico .............. G06F 16/3344 |
| 9,836,455 B2 * | 12/2017 | Martens ............. G06F 40/279 |
| 10,169,768 B2 * | 1/2019 | Dione ............... G06Q 30/0267 |
| 10,402,829 B1 | 9/2019 | Baar et al. |
| 11,144,982 B1 | 10/2021 | Raak et al. |
| 11,734,705 B2 | 8/2023 | Walters et al. |
| 2002/0035539 A1 | 3/2002 | O'Connell |
| 2002/0082995 A1 | 6/2002 | Christie, IV |
| 2002/0111886 A1 | 8/2002 | Chenevich et al. |
| 2002/0123938 A1 | 9/2002 | Yu et al. |
| 2002/0152123 A1 | 10/2002 | Giordano et al. |
| 2002/0194141 A1 | 12/2002 | Langensteiner et al. |
| 2002/0198806 A1 | 12/2002 | Blagg et al. |
| 2003/0028481 A1 | 2/2003 | Flitcroft et al. |
| 2004/0039694 A1 | 2/2004 | Dunn et al. |
| 2004/0068653 A1 | 4/2004 | Fascenda |
| 2004/0128243 A1 | 7/2004 | Kavanagh et al. |
| 2004/0215543 A1 | 10/2004 | Betz et al. |
| 2005/0097019 A1 | 5/2005 | Jacobs |
| 2005/0102243 A1 | 5/2005 | Kinsella et al. |
| 2005/0172137 A1 | 8/2005 | Hopkins |
| 2005/0240527 A1 | 10/2005 | Goldman |
| 2005/0268003 A1 | 12/2005 | Wang et al. |
| 2006/0085337 A1 | 4/2006 | Conforti et al. |
| 2006/0178986 A1 | 8/2006 | Giordano et al. |
| 2007/0039049 A1 | 2/2007 | Kupferman et al. |
| 2007/0124256 A1 | 5/2007 | Crooks et al. |
| 2007/0198495 A1 | 8/2007 | Buron et al. |
| 2008/0101283 A1 | 5/2008 | Calhoun et al. |
| 2008/0120235 A1 | 5/2008 | Chu |
| 2008/0147523 A1 | 6/2008 | Mulry et al. |
| 2008/0222038 A1 | 9/2008 | Eden et al. |
| 2008/0228648 A1 | 9/2008 | Kemper et al. |
| 2008/0257952 A1 | 10/2008 | Zandonadi |
| 2008/0263402 A1 | 10/2008 | Braysy |
| 2009/0012898 A1 | 1/2009 | Sharma et al. |
| 2009/0112651 A1 | 4/2009 | Atkinson |
| 2009/0132424 A1 | 5/2009 | Kendrick et al. |
| 2009/0138968 A1 | 5/2009 | Serber |
| 2009/0164327 A1 | 6/2009 | Bishop et al. |
| 2009/0164330 A1 | 6/2009 | Bishop et al. |
| 2009/0254462 A1 | 10/2009 | Tomchek et al. |
| 2009/0313147 A1 | 12/2009 | Balasubramanian et al. |
| 2010/0022254 A1 | 1/2010 | Ashfield et al. |
| 2010/0051684 A1 | 3/2010 | Powers |
| 2010/0063903 A1 | 3/2010 | Whipple et al. |
| 2010/0106611 A1 | 4/2010 | Paulsen et al. |
| 2010/0114776 A1 | 5/2010 | Weller et al. |
| 2010/0153224 A1 | 6/2010 | Livnat |
| 2010/0174644 A1 | 7/2010 | Rosano et al. |
| 2010/0274720 A1 | 10/2010 | Carlson et al. |
| 2010/0299253 A1 | 11/2010 | Patterson |
| 2010/0325047 A1 | 12/2010 | Carlson et al. |
| 2011/0047075 A1 | 2/2011 | Fourez |
| 2011/0137804 A1 | 6/2011 | Peterson |
| 2011/0238564 A1 | 9/2011 | Lim et al. |
| 2011/0251892 A1 | 10/2011 | Laracey |
| 2011/0317804 A1 | 12/2011 | Kurjanowicz |
| 2012/0030109 A1 | 2/2012 | Dooley Maley et al. |
| 2012/0036013 A1 | 2/2012 | Neuhaus et al. |
| 2012/0059758 A1 | 3/2012 | Carlson |
| 2012/0066107 A1 | 3/2012 | Grajetzki |
| 2012/0072347 A1 | 3/2012 | Conway |
| 2012/0095918 A1 | 4/2012 | Jurss |
| 2012/0143730 A1 | 6/2012 | Ansari et al. |
| 2012/0197708 A1 | 8/2012 | Mullen et al. |
| 2012/0197802 A1 | 8/2012 | Smith et al. |
| 2012/0225639 A1 | 9/2012 | Gazdzinski et al. |
| 2012/0271697 A1 | 10/2012 | Gilman et al. |
| 2012/0300932 A1 | 11/2012 | Cambridge et al. |
| 2012/0303525 A1 | 11/2012 | Sahadevan |
| 2013/0138516 A1 | 5/2013 | White |
| 2013/0282593 A1 | 10/2013 | Merz et al. |
| 2013/0290121 A1 | 10/2013 | Simakov et al. |
| 2013/0332361 A1 | 12/2013 | Ciurea |
| 2013/0332362 A1 | 12/2013 | Ciurea |
| 2013/0346294 A1 | 12/2013 | Faith et al. |
| 2014/0040135 A1 | 2/2014 | Ovick et al. |
| 2014/0040139 A1 | 2/2014 | Brudnicki et al. |
| 2014/0095947 A1 | 4/2014 | Mozak et al. |
| 2014/0258119 A1 | 9/2014 | Canis et al. |
| 2014/0263622 A1 | 9/2014 | Babatz et al. |
| 2014/0279231 A1 | 9/2014 | Pinski et al. |
| 2014/0279309 A1 | 9/2014 | Cowen et al. |
| 2014/0279503 A1 | 9/2014 | Bertanzetti et al. |
| 2014/0304055 A1 | 10/2014 | Faith |
| 2014/0337175 A1 | 11/2014 | Katzin et al. |
| 2014/0358769 A1 | 12/2014 | Howe et al. |
| 2014/0372304 A1 | 12/2014 | Howe |
| 2015/0045064 A1 | 2/2015 | Junkar et al. |
| 2015/0161741 A1 | 6/2015 | Unser et al. |
| 2015/0242949 A1 | 8/2015 | Phillips, IV |
| 2015/0332302 A1 | 11/2015 | Celikyilmaz et al. |
| 2016/0155124 A1 | 6/2016 | Howe |
| 2016/0275781 A1 | 9/2016 | Nold |
| 2017/0024743 A1 | 1/2017 | Fogel et al. |
| 2017/0109745 A1 | 4/2017 | Al-Bedaiwi et al. |
| 2017/0116585 A1 | 4/2017 | Rosano |
| 2017/0148020 A1 | 5/2017 | Vienravee |
| 2017/0300894 A1 | 10/2017 | Shanmugam |
| 2018/0005241 A1 | 1/2018 | Smothers et al. |
| 2018/0165759 A1 | 6/2018 | Carrington et al. |
| 2018/0225656 A1 | 8/2018 | Ray et al. |
| 2018/0357687 A1 | 12/2018 | Groarke |
| 2019/0147448 A1 | 5/2019 | Allbright et al. |
| 2019/0392443 A1 | 12/2019 | Piparsaniya et al. |

(56) References Cited

U.S. PATENT DOCUMENTS

| | | | |
|---|---|---|---|
| 2020/0118133 A1 | 4/2020 | Schmidt et al. |
| 2020/0226609 A1 | 7/2020 | Dixit |
| 2020/0394086 A1 | 12/2020 | Lee |
| 2021/0217035 A1 | 7/2021 | Williams et al. |
| 2021/0350340 A1 | 11/2021 | Lai et al. |
| 2022/0076231 A1 | 3/2022 | Farrell et al. |

OTHER PUBLICATIONS

Anonymous, "Payment Authorization Based On A Variable Payment Authorization Score," IPCOM000153889D, 2007, https://priorart.ip.com/IPCOM/000153889 (Year: 2007).

D. Berbecaru, "LRAP: A Location-Based Remote Client Authentication Protocol for Mobile Environments," 2011 19th International Euromicro Conference on Parallel, Distributed and Network-Based Processing, 2011, pp. 141-145, doi: 10.1109/PDP.2011.32 (Year: 2011).

F.S. Park, C. Gangakhedkar and P. Traynor, "Leveraging Cellular Infrastructure to Improve Fraud Protection," 2009 Annual Computer Security Applications Conference, 2009, pp. 350-359, doi: 10.1109/ACSAC.2009.40 (Year: 2009).

J.T.S. Quah and M. Sriganesh, "Real Time Credit Card Fraud Detection using Computational Intelligence," 2007 International Joint Conference on Neural Networks, 2007, pp. 863-868, doi: 10.1109/IJCNN.2007.4371071 (Year: 2007).

N. Nassar and G. Miller, "Method for secure credit card transaction," 2013 International Conference on Collaboration Technologies and Systems (CTS), 2013, pp. 180-184, doi: 10.1109/CTS.2013.6567226. (Year: 2013).

S.W. Neville and M. Horie, "Efficiently Achieving Full Three-Way Non-repudiation in Consumer-Level eCommerce and M-Commerce Transactions," 2011IEEE 10th International Conference on Trust, Security and Privacy in Computing and Communications, 2011, pp. 664-672, doi: 10.1109/TrustCom.2011.85. (Year: 2011).

"NETRESEC Network Security Blog." NETRESEC Network Security Blog. Web. , Mar. 11, 2011.

ISO 8583, Wikipedia, the free encyclopedia, retrieved on Jun. 9, 2011 from https://web.archive.org/web/20110609034342/htttps://en.wikipedia.org/wiki/ISO_8583 (Year: 2011).

Radu, Christian, Implementing Electronic Card Payment Systems, Artech House, 2002. Chapter 2 (Year: 2002).

Ranjan, "Tokenization of a physical debit or credit card for payment", IP.com, 2007, 10 pages. https://priorart.ip.com/IPCOM/000251283.

Sniffing Tutorial part 1—intercepting Network Traffic, NETRESEC Network Security Blog. Web. , Mar. 11, 2011. http://www.netresec.com/?page=Blog&month=2011-03&post=Sniffing-T utorial-part-1---Intercepting-Network-T raffic.

Anonymous, "Managing Transaction Billing Across a Plurality of Billing Sources Utilizing an Interface," The IP.com Journal, 2009, retrieved from https://priorart.ip.com/l PCOM/000182419 (Year: 2009).

Anonymous, "User Initiatiated and Controlled Mobile Payment Solution," The IP.com Journal, 2021, retrieved from https:// priorart.ip.com/l PCOM/000266984 (Year: 2021).

C. -C. Michael Yeh, Z. Zhuang, Y. Zheng, L. Wang, J. Wang and W. Zhang, "Merchant Category Identification Using Credit Card Transactions," 2020 IEEE International Conference on Big Data (Big Data), Atlanta, GA, USA, 2020, pp. 1736-1744, doi: 10.1109/BigData50022.2020.9378417. (Year: 2020).

Merdler, "Creating a secure channel," codeproject.com, 2008, retrieved on Oct. 14, 2012 from https://web.archive.org/web/20121014091727/https://www.codeproject.com/Articles/26332/Creating-a-secure-channel (Year: 2008).

V. Meltsov, P. Novokshonov, D. Repkin, A. Nechaev and N. Zhukova, "Development of an Intelligent Module for Monitoring and Analysis of Client's Bank Transactions," 2019 24th Conference of Open Innovations Association (FRUCT), Moscow, Russia, 2019, pp. 255-262, doi: 10.23919/FRUCT.2019.8711931. (Year: 2019).

\* cited by examiner

| COF Merchant | Recurring Payments | User Control |
|---|---|---|
| 24-Hour Fitness | Y - $29.99/ mo | • CANCEL OR BLOCK<br>• CONFIRM<br>• DISPUTE<br>• UPDATE CARD<br>• CLICK-TO-CONTACT MERCHANT<br>• ALERT ME |
| Gas Company | Y – 8th day of mo | • CANCEL OR BLOCK<br>• CONFIRM<br>• DISPUTE<br>• UPDATE CARD<br>• CLICK-TO-CONTACT MERCHANT<br>• ALERT ME |
| Amazon | N | • CANCEL OR BLOCK<br>• CONFIRM<br>• DISPUTE<br>• UPDATE CARD<br>• CLICK-TO-CONTACT MERCHANT<br>• ALERT ME |

*FIG. 4B*

MERCHANT LOGO DETECTION ARTIFICIAL INTELLIGENCE (AI) FOR INJECTING USER CONTROL TO ISO BACK-END TRANSACTION APPROVALS BETWEEN ACQUIRER PROCESSORS AND ISSUER PROCESSORS OVER DATA COMMUNICATION NETWORKS

CROSS-REFERENCE TO RELATED APPLICATIONS

This application claims priority as continuation-in-part to U.S. application Ser. No. 16/551,166 filed Aug. 26, 2019, now abandoned, which in turn, is a continuation-in-part of U.S. application Ser. No. 16/227,560 filed Dec. 20, 2018, now abandoned, and U.S. application Ser. No. 16/227,560 is a continuation-in-part of U.S. application Ser. No. 14/058,229 filed Oct. 19, 2013, now abandoned, and a continuation-in-part of U.S. application Ser. No. 13/527,544 filed Jun. 19, 2012, now abandoned, the contents of each being hereby incorporated by reference in their entirety.

FIELD OF THE INVENTION

The invention relates generally, to computer networking security, and more specifically, to merchant logo detection AI for injecting user control to ISO back-end transaction approvals between acquirer processors and issuer processors over a data communication network.

BACKGROUND

On the one hand, card users rely upon availability of electronic funds for point-of-sale and online purchases with merchants. When an electronic payment fails due to issues within the system, apart from actual availability of electronic funds, card users can have services disrupted, purchases failed, and even be embarrassed in front of friends. One case of failed user card transactions arises when there is a change in the underlying user card being used for the transaction. For example, if an existing card is lost or stolen, and a new physical card is typically issued by mail to the address on file and, after receipt, the card user manually updates the card information. In the meantime, no electronic payments can be consummated.

On the other hand, card users may be suspicious of COF (card on file) merchants that store the user card information so that the user does not have to reenter for each use. In the case of recurring payments, COF merchants automatically consummate charges for a predetermined amount at a predetermined frequency, such as monthly dues for a health club membership. If a user is suspicious, card users have a lack of control over COF merchants and recurring payments. The conventional options for control are to submit a dispute with the credit card company or the merchant. But this can be time consuming and complicated.

Thus, users have a lack of control over COF merchants and recurring payments. For example, attempts to make a recurring charge to a lost or stolen card may be unintentionally made if the card user is not able to update with the new physical card in time. The unintentional transaction should be rejected by a financial transaction system. The failed transactions can raise red flags by the COF merchant or recurring transaction processor with respect to the card user. In turn, red flags can also be raised by an acquirer processor or issuer processor with respect to the COF merchant or recurring transaction processor. The result can lead to service or product cancelations, late fees, bad faith, and other consequences. There can also be a chilling effect on conducting online transactions.

Moreover, because ISO transactions are not designed for consumer access, ISO transactions have no merchant logo embedded in data packets carrying individual transactions across the back-end transaction process. Logo identification is conventionally a manual process in which a specific image file is uploaded and associated with a specific merchant. A user viewing transactions may have difficulty having to mentally recall merchants for transactions.

What is needed is a robust technique for merchant logo detection AI for injecting user control to ISO back-end transaction approvals between acquirer processors and issuer processors over a data communication network.

SUMMARY

To address the above-mentioned shortcomings, methods, computer-readable mediums, and devices are provided for merchant logo detection AI for injecting user control to ISO back-end transaction approvals between acquirer processors and issuer processors over a data communication network.

In an embodiment, a transmission of ISO data packets with merchant name is received. Raw merchant data from the ISO data packets is transformed to enriched merchant data. Logo candidates for a specific ISO data can be identified from external resources based on the enriched merchant data.

In another embodiment, low quality images of the logo candidates are filtered out with image analysis including entropy ratio evaluations of the logo candidates. Also, the logo candidates are processed with high quality filtering including classification of the logo candidates with a deep learning classifier for distinguishing logos from non-logos.

In still another embodiment, a logo from the logo candidates is selected to associate with the ISO data packets. A display having the selected logo associated with a transaction of the ISO data packets can be generated for display to users.

Advantageously, spectral analysis technology is used to improve network transaction technology. Furthermore, the technical field of network security is improved by reducing falsely declined transactions, and network performance is improved for the user.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 4A and 4B is a block diagram illustrating merchant logos displayed on various pages to a user in association with transactions, according to an embodiment.

DETAILED DESCRIPTION

Systems with computer hardware devices, computer-implemented methods, and (non-transitory) computer-readable mediums, for merchant logo detection artificial intelligence (AI) for injecting user control to ISO back-end transaction approvals between acquirer processors and issuer processors over a data communication network, are disclosed.

The examples detailed herein are non-limiting and concise. For instance, merchant transactions in the ISO 8583 format for network data packets can also be applied to non-merchant transactions and other packet formats.

I. System for Merchant Logo Detection AI (FIGS. 1-4)

Figure 1A:
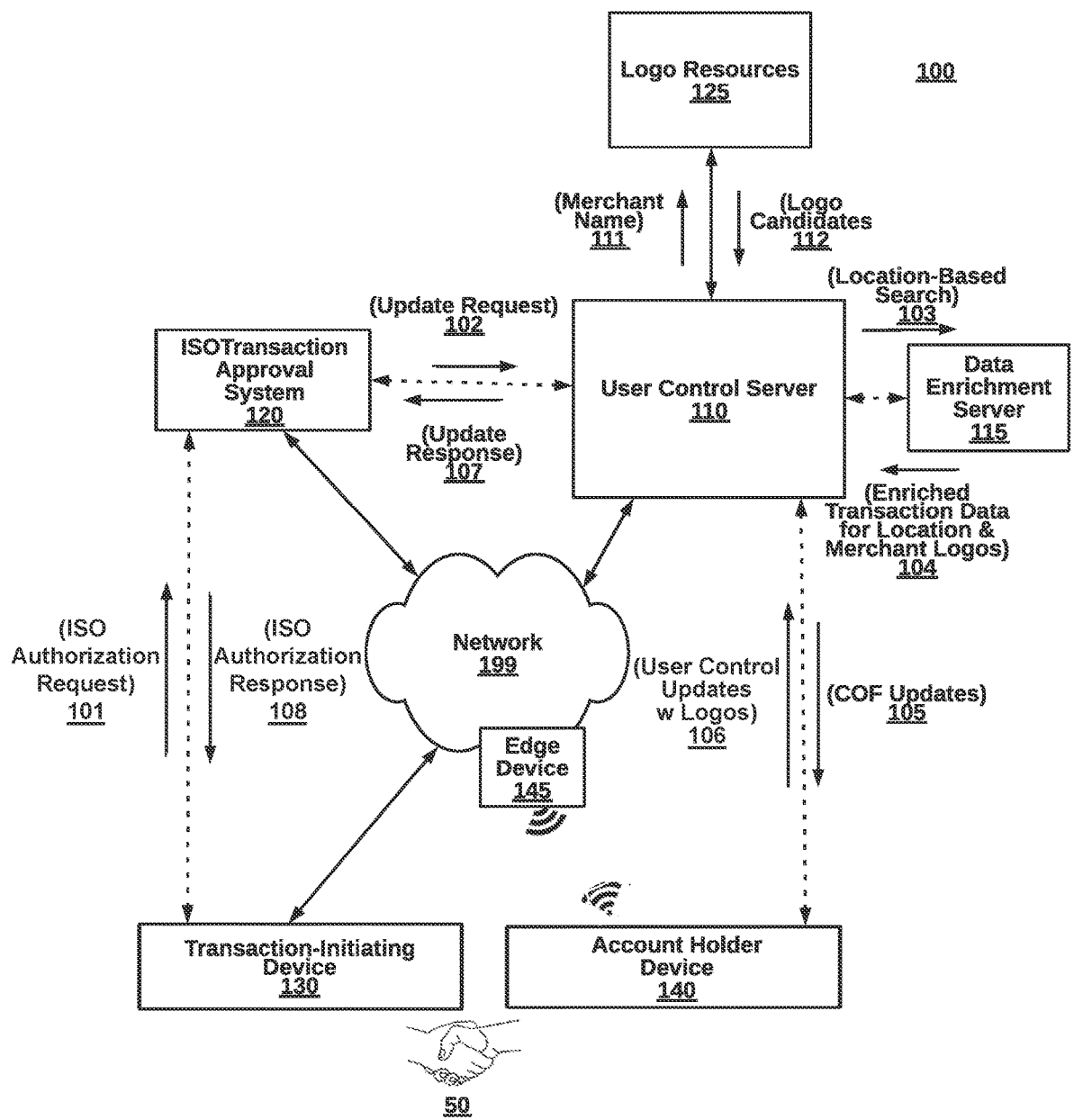
FIG. 1A is a high-level block diagram illustrating a system for merchant logo detection AI for injecting user control to ISO back-end transaction approvals between acquirer processors and issuer processors over a data communication network, according to an embodiment.

FIG. 1A is a high-level block diagram illustrating a system 100 for merchant logo detection AI for injecting user control to ISO back-end transaction approvals between acquirer processors and issuer processors over a data communication network, according to an embodiment. The system 100 primarily comprises a user control server 110, a transactional approval system 120, a transaction-initiating device 130 and an account holder device 140. Additional network components can also be part of the system 100, such as firewalls, virus scanners, routers, switches, application servers, databases, data lakes, data warehousing, as well as additional controllers, access points, access switches, stations, SDN (Software-Defined Networking) controllers, Wi-Fi controllers, and the like. The network components can be implemented as hardware, software, or a combination of both, for example, as described with respect to the computing environment of FIG. 10.

Each of the primary components are coupled in communication through a network 199. The account holder device 140 may be a mobile device using Wi-Fi or cellular, for example, that couples to an edge device 145 for access to the network 199. The network 199 may be the Internet, a wide area network, a local area network, a cellular network (e.g., 3G, 4G, 5G or 6G), Wi-Fi, or a hybrid network.

A. Enriched Merchant Data for ISO Transactions

The user control server 110 is coupled in communication over the network 199 with data enrichment server 115 to receive merchant logos selected according to machine learning. In one embodiment, the user control server 119 receives an update request 102 along with a copy of an ISO authorization request 101 and responds with an update response 102. The update response 102 can include a new user card number, a new expiration date, a product upgrade, information from a portfolio conversion, user controls, or the like. To determine updates, the user control server 110 continually classifies ISO transactions to identify COF merchants and recurring payments associated with a particular user card. A list of COF merchants and recurring payments is determined, and updated as new ISO transactions are classified. The user control server 110 can provide the list of COF merchants and recurring payments back to elements of the ISO transaction approval system 120, such as a financial institution or issuer processor. COF merchants, as referred to herein, store user card data used by a merchant device to fund purchases that are either automatically triggered (Amazon Prime annual fee) or manually triggered (e.g., Amazon toy purchase). Further, recurring transactions are subset of transactions conducted by the COF merchant. A transaction is recurring if it is automatically conducted at some frequency for a standard amount. The Amazon Prime annual fee may be charged on May 1st of each year with the same card data, recurring, and without new authorization from the card holder. In one embodiment, besides detecting recurring merchants (merchant-level insights), it can also detect recurring insights at the combination of card and merchant level. So, for each card and merchant information, frequency, trial end date, next billing date, and estimated amount, are known based on history.

In an embodiment, updates to a specific user card are received and processed by the user control server 110. The updates can be initiated by financial institutions or issuer processors or by users themselves. For example, when a new user card is requested or automatically dispatched by mail to a Chase card holder, Chase can immediately send updated card information to the user control server 110 over a secure channel before the Chase card holder is even aware that the new user card exists. The update, in turn, can be applied to the list of COF and recurring payments in either a push or pull distribution. The user can also be notified of COF updates 105 and make decisions to inject control how the new information is disseminated. In some cases, a card user may be suspicious of a particular merchant or POS type and wish to discontinue by precluding the update. A user app on the account holder device 140 with a touch screen button can be pressed, thereby providing card users with easy access to a traditionally closed loop ISO transaction approval system 120.

The data enrichment server 115, in one embodiment, selects merchant logos by first extracting raw merchant data from the ISO authorization request for conversion to enriched merchant data for the list of merchants. The raw merchant data is typically customized by a particular merchant and their business practice, or there is any protocol at all. Enriched merchant data, on the other hand, is normalized with known commercial names. This prevents several different COF merchant entries for a common merchant, for example, at different locations. While raw merchant data can have 2, 10 or more variations, enriched merchant data is coalesced under a single entry. When a customer wants to cancel a recurring payment at Walmart, for example, all the transactions and actions are accessible under a single commercial name rather than having to individually check each name and decipher raw merchant data. Some merchants have more than one enriched merchant names, such as Amazon Prime and Amazon Fresh. In one embodiment, the data enrichment server 115 is an optional part of the system 100.

For the data enrichment option, the user location 103 for the account holder device 140 can be pushed or pulled and utilized to filter search results of a places server. For example, a data field has WLMRT within close proximity to a known Walmart store, the custom abbreviation can be enriched to the common trade name. The location is preferably in real-time with data enrichment, but in some cases, is done asynchronously. GPS, Wi-Fi triangulation, IP address analyses, or other techniques at the account holder device 140 determines local geo-coordinates and sends to the data enrichment server 115. In one case, the data enrichment server 115 uses algorithms to predict the location based on previous locations. In another case, the data enrichment server 115 infers location from the merchant location, IP address, or any other appropriate technique.

In some embodiments, the data enrichment server 115 is part of a third-party fraud detection system, separate from the card updater system or the transaction approval system 120. In other embodiments, the data enrichment server 115 can be integrated with the user control server 110. The data enrichment server 115 is set forth in more detail with respect to FIG. 4 below.

B. Logo Selection AI for ISO Transactions

The data enrichment server 115 is also communicatively coupled to logo resources 125 to associate logos with the ISO transactions based on the enriched merchant data. A network communication interface coupled to the data communication network, receives ISO data packets with a transaction. The user control server 110 transforms raw merchant data from the ISO data packets to enriched merchant data.

Figure 1B:
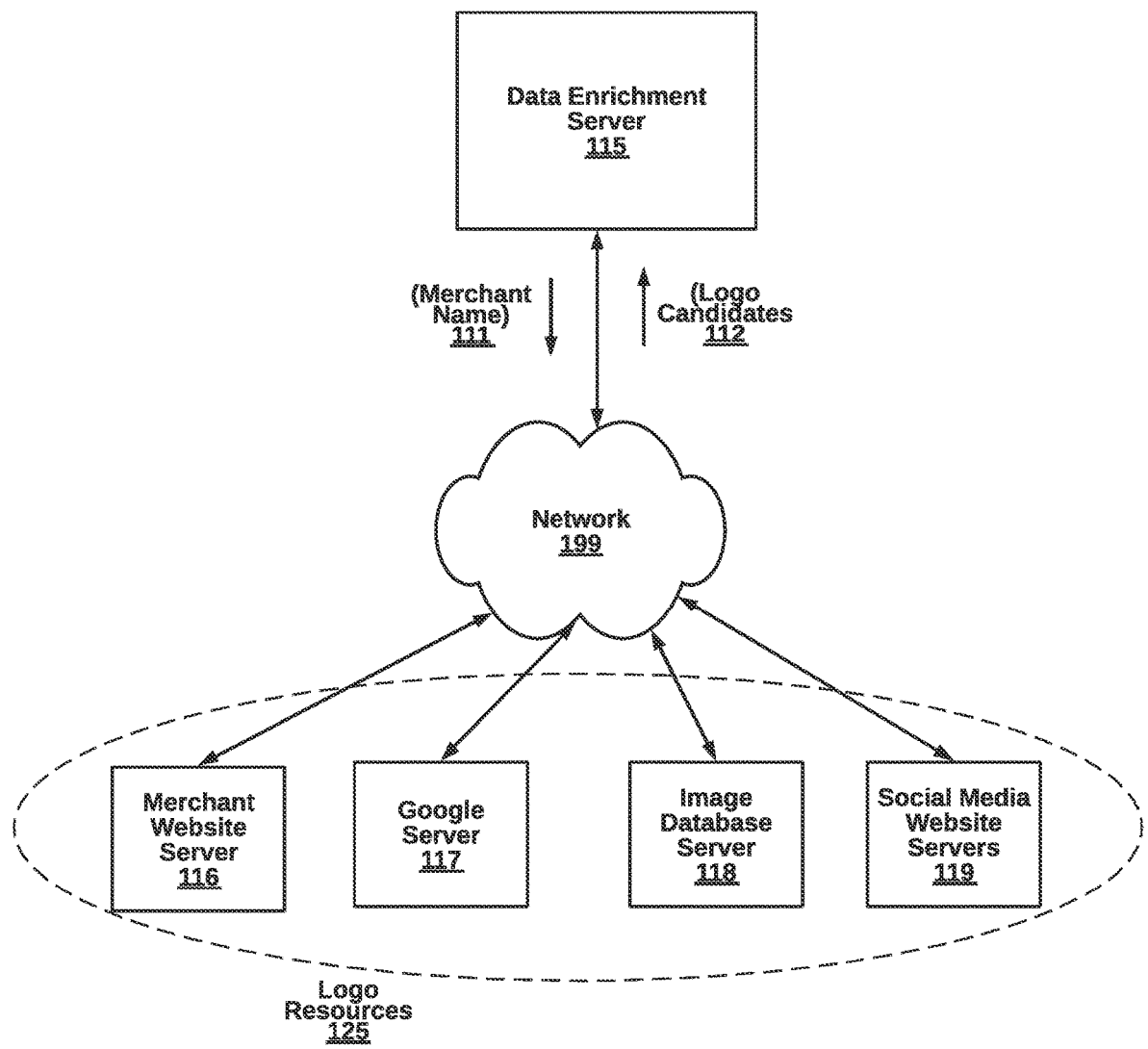
FIG. 1B is a high-level block diagram illustrating a data enrichment server of FIG. 1A accessing logo resources, according to an embodiment.

Logo candidates are identified for a specific ISO data from external resources based on the enriched merchant data, as shown in FIG. 1B. The data enrichment server 115 can be coupled in communication over the network 199 to one or more resources including a merchant website server 116, a Google server 117, an image database server 118, and social media website severs 119. The merchant website server 116 can be found from a Google search or other database, and then searched for images that could be logos. The Google server 117 can be searched for SERP results which may also include some photos or videos. Additionally, hyperlinks in the SERP results can lead to other website candidates for extracting logos. The image database server 118 can be, for example, Google Images, Pinterest, Shutterfly, or any other online database of photos or logos. In one example, Google Image results for "Merchant 1 logos" as a search term are collected and analyzed. The potential logo may have to be extracted from a website linked from the image listing. The social media website servers 119, such as Facebook, Instagram, Snapchat, Twitter and TikTok also include merchant logos in advertisements and otherwise. Many merchants maintain a Facebook business page from which logos can be extracted. In an embodiment, application program interfaces (APIs) are used to communicate with the social media website servers 119 for logging on, submitting search queries, receive output data, and otherwise conducting automatic transactions.

The potential logos are then filtered to identify a default logo image to associate with transactions. First, low quality images of the logo candidates are filtered out with image analysis including entropy ratio evaluations of the logo candidates. Next, processing the logo candidates with high quality filtering including classification of the logo candidates with a deep learning classifier for distinguishing logos from non-logos. Based on the outcomes, and how a specific implementation weighs the underlying factor, a logo is selected from the logo candidates to associate with the ISO data packets. In one implementation, once a logo has been selected for a merchant, it can be reused for later ISO transactions by the user or by other users.

Users log on for access to a display having the selected logo associated with a transaction of the ISO data packets. Further details concerning the data enrichment server 115 are set forth below with respect to FIG. 3B.

C. Transaction Approval

The transactional approval system 120, in an embodiment, is a backend to a payment authorization system for credit card transactions for a merchant. The transactions can be financial transactions, such as a credit card approval, a debit card approval, an ACH, or other financial transactions. In other embodiments, the transactions are non-financial. The financial transaction approval system can include an acquirer processor, a card network, an issuer processor, a card issuer, and an account host. Responsive to a transaction initiated at the merchant, the acquirer processor can send the ISO authorization request according to the ISO 8583 standard, including a x100 or a x200 message type, with a transaction card number, transaction card credentials, merchant information, transaction amount, and other mandatory and optional fields. The card network does validity checks on the ISO authorization request and involves any additional services the acquirer or issuer have signed up for (such as address validation, PIN validation, risk scoring, and the like), and then forward the ISO authorization request to the issuer processor. The issue processor can perform validity checks and invoke value-added services such as risk scoring and cardholder policy checks, before checking with an account host if a user account has adequate funds to satisfy a transaction request. The account host responds to the issuer processor with an approval or denial that the issuer processor can form into an ISO authorization response, along with a approve or denial reason code. The card network forwards the ISO authorization response to the acquirer processor, and in turn, back to the merchant at the POS. Many other approval systems are possible.

In one embodiment, the transactional approval system 120 subscribes to the user control server 110 for updates to user card data. For instance, an update service can check for any changes to user card data stored by a merchant device. Data can be pushed through a subscription, or data can be pulled by merchant checks.

Conventional payment authorization systems typically block out the account holder device 140 from participation in approvals through payment controls. By contrast, the user control server 110 is able to implement controls of the account holder device 140 by registering a user account with a third party administrating the data enrichment server 115.

In an alternative embodiment, a third-party COF server (not shown) provides user control of COF merchants outside of the ISO transactional approval system 120. In other words, one embodiment bypasses the traditional financial system for managing COF merchants and recurring transactions.

The transaction-initiating device 130, can be a merchant device or other POS, where a merchant swipes a transaction card through a transaction card reader which uses transceiver coupled to the network 199 for transmitting an ISO authorization request to the transaction approval system 120 for approval. In an embodiment, the transaction-initiating device 130 is a COF merchant storing user card data, for various reasons. In one instance, Amazon stores user cards for easy check out. In another instance, Spotify stores user cards, and charges a premium service fee at the same time of each month, for the same amount each month. Some COF transactions are recurring transactions. One implementation of the transaction-initiating device 130 is a terminal at a gym using Stripe to charge for membership services. The card may be stored for monthly fees. If the case of updated user card data, the transaction-initiating device 130 avoids declines by pushing the update initiated by a user.

The account holder device 140 for a purchaser, for example, can be a user device such as a mobile telephone, electronic payment device, an iPad, laptop computer, or the like. The purchaser or other user logs onto the data enrichment server 110 with authentication credentials to create a secure channel for location sharing, changing transaction controls, and managing transactions. In one implementation, a mobile application is downloaded to the account holder device 140 for communication with the user control server 110. In another embodiment, an operating system or Bluetooth-connected device communicates with the data enrichment server 110.

In one embodiment, users log from the account holder device 140 log on to the user control server 110 to review ISO transactions and other transactions. Examples of user interfaces are shown in FIG. 4. In another embodiment, a pop-up screen or notification can be shown on the account holder device 140 with a logo and transaction information. The transaction can be a past transaction or a real-time transaction awaiting approval.

Figure 2:
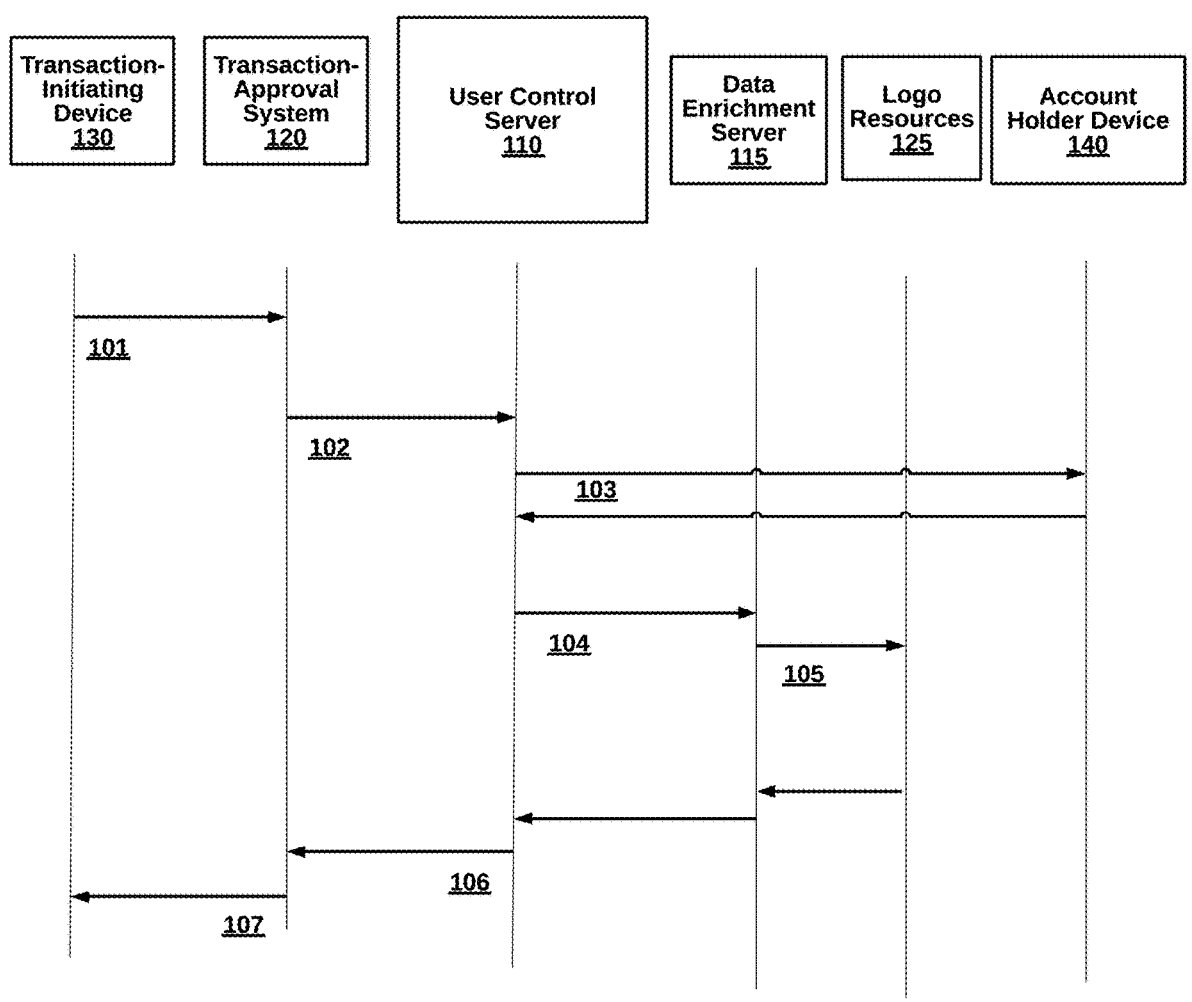
FIG. 2 is a sequence diagram illustrating interactions between the components of the system of FIG. 1A, according to an embodiment.

FIG. 2 is a sequence diagram illustrating interactions between the components of the system of FIG. 1, according to an embodiment. Variations in the sequence are possible. For instance, real-time card updates and real-time user controls are shown in the interactions of FIG. 2. However, in other embodiments, updates can be pulled from the user control server 110 in batch mode. In still other embodiments, user COF controls are applied separately from real-time ISO transactions.

At interaction 101, the transaction-initiating device 130 receives data from a payment card swipe by the merchant or the user (or Apple Pay, an NFC contactless swipe, or otherwise) thereby initiating the network security techniques descried herein. Data packets including an ISO authorization request are sent to the transactional-approval system. The transmission channel can be, for example, an end-to-end wired connection, a Wi-Fi or other wireless connection, or a hybrid network.

At interaction 102, an update request checks for COF or recurring payment updates by sending a copy of the ISO authentication request. At interactions 103, a location is retrieved from the account holder device 140. Location can be provided by the account holder device 140, can be provided by the merchant, or can be predicted. In turn, a location-based search query is sent to the data enrichment server 115 at interactions 104 and a response of enriched merchant data is sent back. At interactions 105, a search query is sent from the data enrichment server 115 to the logo resources 125 to retrieve a list of logo candidates, in one example. The list of merchants compiled from enriched data, along with logos selected for each merchant, can be sent as COF updates to the account holder device. User actions, user payment controls, geographical fencing, or charge amount limitations, or other processes can be applied at this point and are sent as user COF controls from the account holder device 140 back to the user control server 110. At interaction 106, an update response is sent back to the transaction approval system 120. At interaction, 107 the ISO authorization response is sent to the transaction-initiating device 130. In response, a release of goods to the user can be allowed or disallowed by the merchant, in one example.

Figures 3A, 3B, 3C:
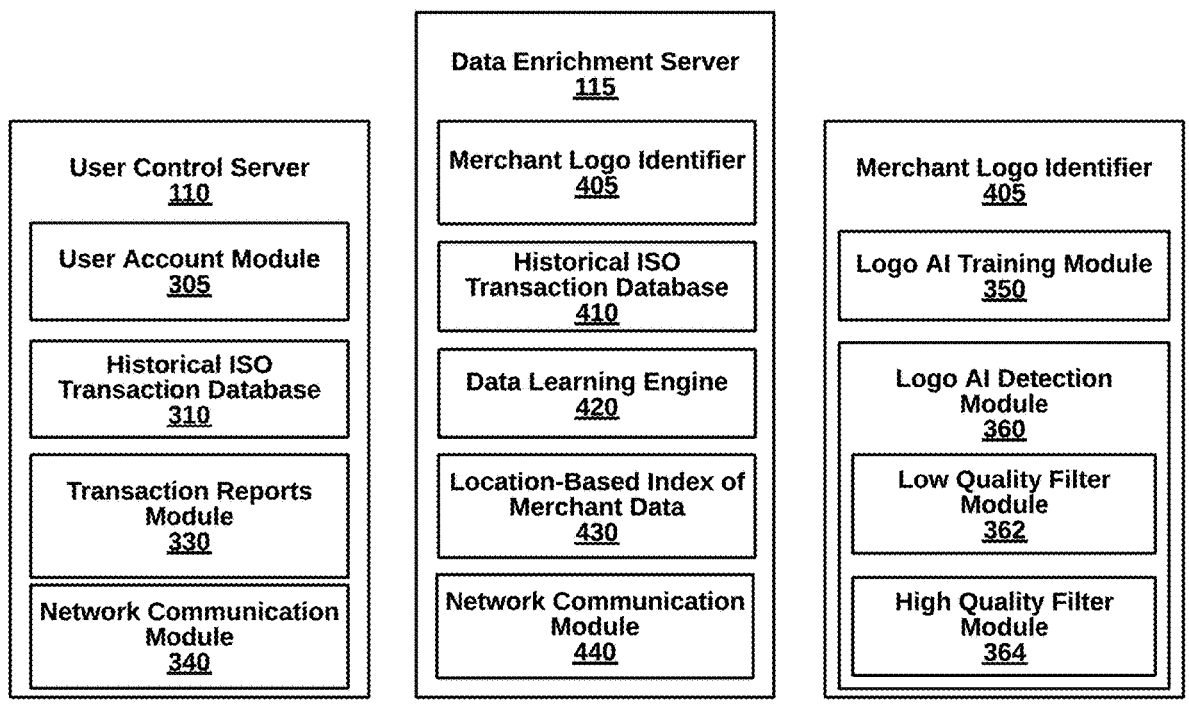
FIG. 3A is a more detailed block diagram illustrating a user control server of the system of FIG. 1A, according to some embodiments.
FIG. 3B is a more detailed block diagram illustrating a data enrichment server of the system of FIG. 1A, according to some embodiments.
FIG. 3C is a more detailed block diagram illustrating a merchant logo identifier of the system of FIG. 3B, according to some embodiments.

FIG. 3A is a more detailed block diagram illustrating a user control server of the system of FIG. 1, according to some embodiments. The user control server 110 includes a user account module 305, a historical ISO transactional database 310, a user accounts and transaction reports module 330, and a network communication module 340. The components can be implemented in hardware, software, or a combination.

A user account module 305 provides user interfaces to receive input from users seeking control over transactions. A user interface can include a list of past and future transactions (e.g., ISO transactions), merchant names as identified in enriched merchant data, and logo associated with a group of transactions conducted with a particular merchant. Transactions can also be categorized, in one embodiment, and each category divided by a merchant logo for easy identification. The transactions can be detailed, summarized, and/or aggregated. In one embodiment, the user account module 305 receives logos from the data enrichment server 115 along with enriched merchant data for generating user reports and displays. In another embodiment the user account module 305 initiates the process by actively requesting logos.

Figure 4A:
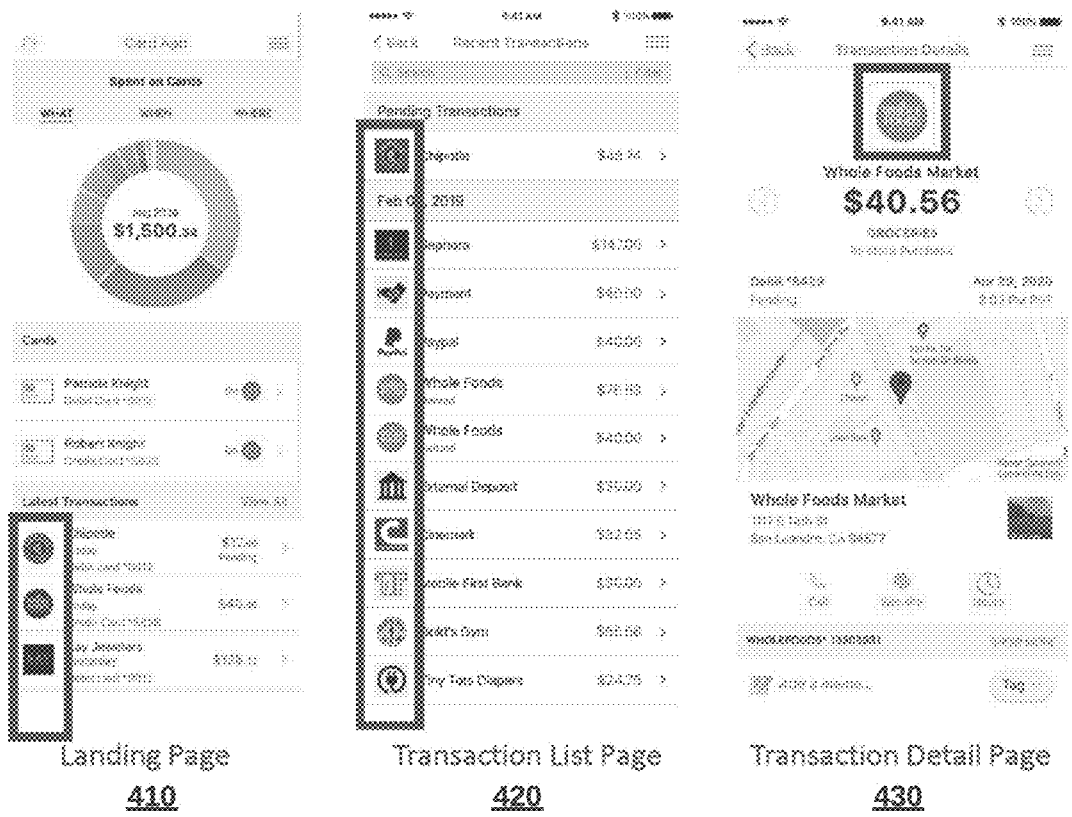

FIG. 4A shows examples of user interfaces with logos as displayed on a smartphone. A landing page 410 shows a categorized view of top merchants or recent merchants with logos. A transaction list page 420 lists out each individual transaction with logo, for example, in chronological order, or in another example, by locations on a map. A transaction detail page 430 lists further details for a specific ISO transaction with a logo, such as card used, date and time, location of purchase, map detail, and contact hyperlinks. Meanwhile, FIG. 4B shows an example user interface with logos for asserting user control over COF merchants and recurring transactions. As shown, COF merchants are listed, some of which have associated recurring payments (i.e., 24-hour Fitness at $29.99 per month, and gas company billing on the 8th day of the month, although amounts may be different) and some do not have associated recurring payments (i.e., Amazon stored a card but purchases are not necessarily periodic in amount or date). Further, user controls allow a direct action to the COF merchant such as canceling the COF information, confirming the recurring payment, limiting charges by geo-location or amount, updating the card, clicking to contact the merchant, and alerting the user. The user can update the card or give permission to the card updater to do so automatically. Many other variations are possible.

Referring again to FIG. 3A, the historical ISO transactional database 310 stores previous ISO authentication requests and responses for training the transaction classifier 320. The previous transactions can be limited to a specific user, a specific location (e.g., zip code, city or state), a specific transaction type (e.g., recurring transactions), or as otherwise needed for a specific implementation.

The transaction reports module 330 displays different reports of ISO transactions to users. For example, recurring payments can be identified and noted. Card on file vendors can be specifically identified. Users can then manage preferences in the user accounts module 305 based on reporting from the transaction reports module 330.

The network communication module 340 can include a network interface, transceivers, antenna, protocol software, operating systems, APIs and other necessary components.

FIG. 3B is a more detailed block diagram illustrating a data enrichment server 115 of FIG. 1, according to some embodiments. The data enrichment server 115 includes a merchant logo identifier 405, a historical ISO transactional database 410, a data learning engine 420, a location-based index of merchant data 430 and a network communication module 440. The components can be implemented in hardware, software, or a combination.

The merchant logo identifier 405 leverages machine learning to improve logo selection, as shown in FIG. 3C. The merchant logo identifier 405 includes a logo AI training module 350 and a logo AI detection module 360. The training module 350 uses past ISO transactions to develop models for prediction of merchant logos that match incoming ISO transactions (e.g., real-time ISO transactions).

The logo AI detection module 360 further includes a low quality image resolution module with an image resolution module, an aspect ratio module and an entropy module to perform a low quality check with image analysis to identify a set of candidate logos. In one embodiment, an ideal entropy range can be set, along with other factors discussed below.

The logo detection module 360 further includes a high quality image resolution module with a deep learning network engine, a text similarity engine, and an image similarity engine. The deep learning network engine distinguishes icons from non-icons based on a training set of data that is updated over time. The text similarity engine can use fuzzy matching at scale to identify relationships (e.g., Circle K versus Circle). A merchant names from enriched merchant data can be compared against text associated with logo candidates. The text can be metadata separate from the image, or embedded text. OCR can be used to identify embedded text. Higher weight is given to logo candidates that more closely match the enriched merchant data.

Referring again to FIG. 3B, the historical ISO transactional database 410 stores previous ISO authentication requests and responses for training the data learning engine 420. The previous transactions can be limited to a specific user, a specific location (e.g., zip code, city or state), a specific transaction type (e.g., recurring transactions), or as otherwise needed for a specific implementation. In an alternative embodiment, the historical ISO transactional database 410 stores previous ISO authentication request for other users. As a result, recurring transactions can be identified for a particular user from historical information and patterns of others. This is particularly useful for identifying recurring payments from a first payment of the series, for example.

The location-based index of merchant data 430 is generated from the learning process as varying merchant names are coalesced under a single name, and payment controls are implemented through the single name. Being local to the data enrichment server 115, one embodiment provides real-time look-up of enriched merchant data and when there is a cache miss, raw merchant data is used for making decisions. The enriched data can be retrieved from a places server.

Preferably, the data enrichment server 115 is under independent control from the transaction approval system 120. As a result, the location-based index is controlled and leveraged by the user typically precluded from the ISO transaction data path.

The network communication module 440 can include a network interface, transceivers, antenna, protocol software, APIs and other aspects necessary.

II. Methods for Merchant Logo Detection with AI (FIGS. 5-9)

Figure 5:
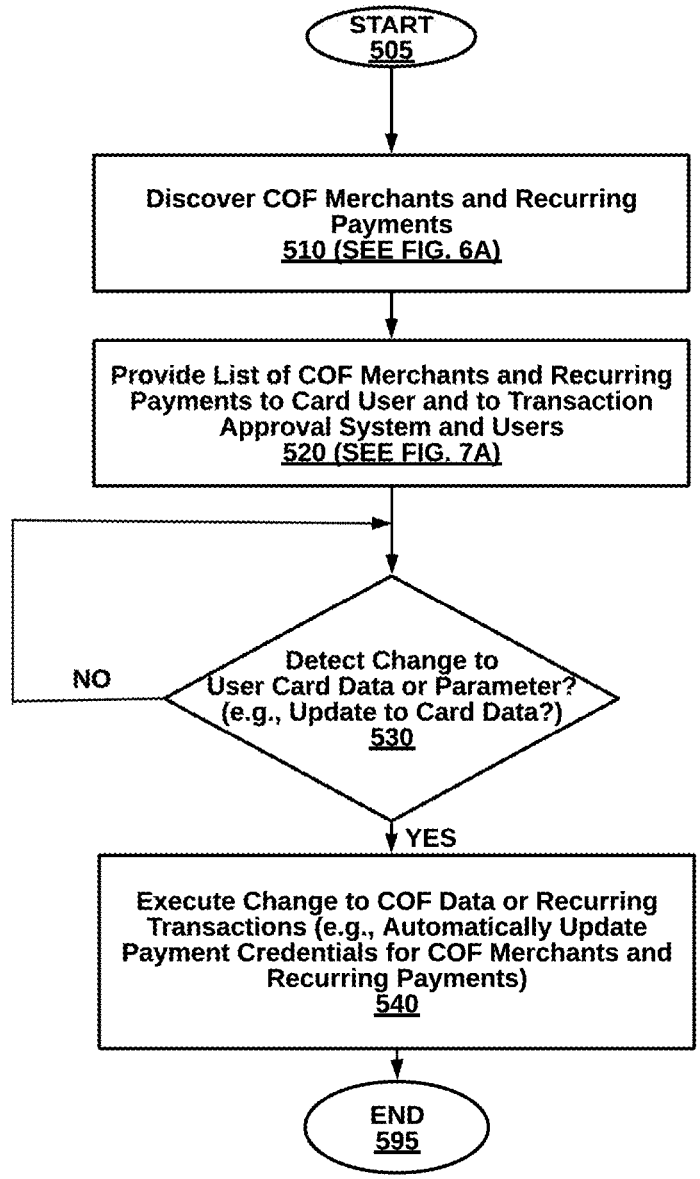
FIG. 5 is a high-level flow diagram illustrating a method for merchant logo detection AI for injecting user control to ISO back-end transaction approvals between acquirer processors and issuer processors over a data communication network, according to an embodiment.

FIG. 5 is a high-level flow diagram illustrating a method for merchant logo detection AI for injecting user control to ISO back-end transaction approvals between acquirer processors and issuer processors over a data communication network, according to an embodiment. The steps herein are merely example groupings of functionality that can be performed in different orders, enhanced with other steps, and otherwise modified under the spirit of the present disclosure. Many variations are possible. For example, logo detection can be implemented in other contexts besides COF and recurring merchant transaction data.

Figure 6A:
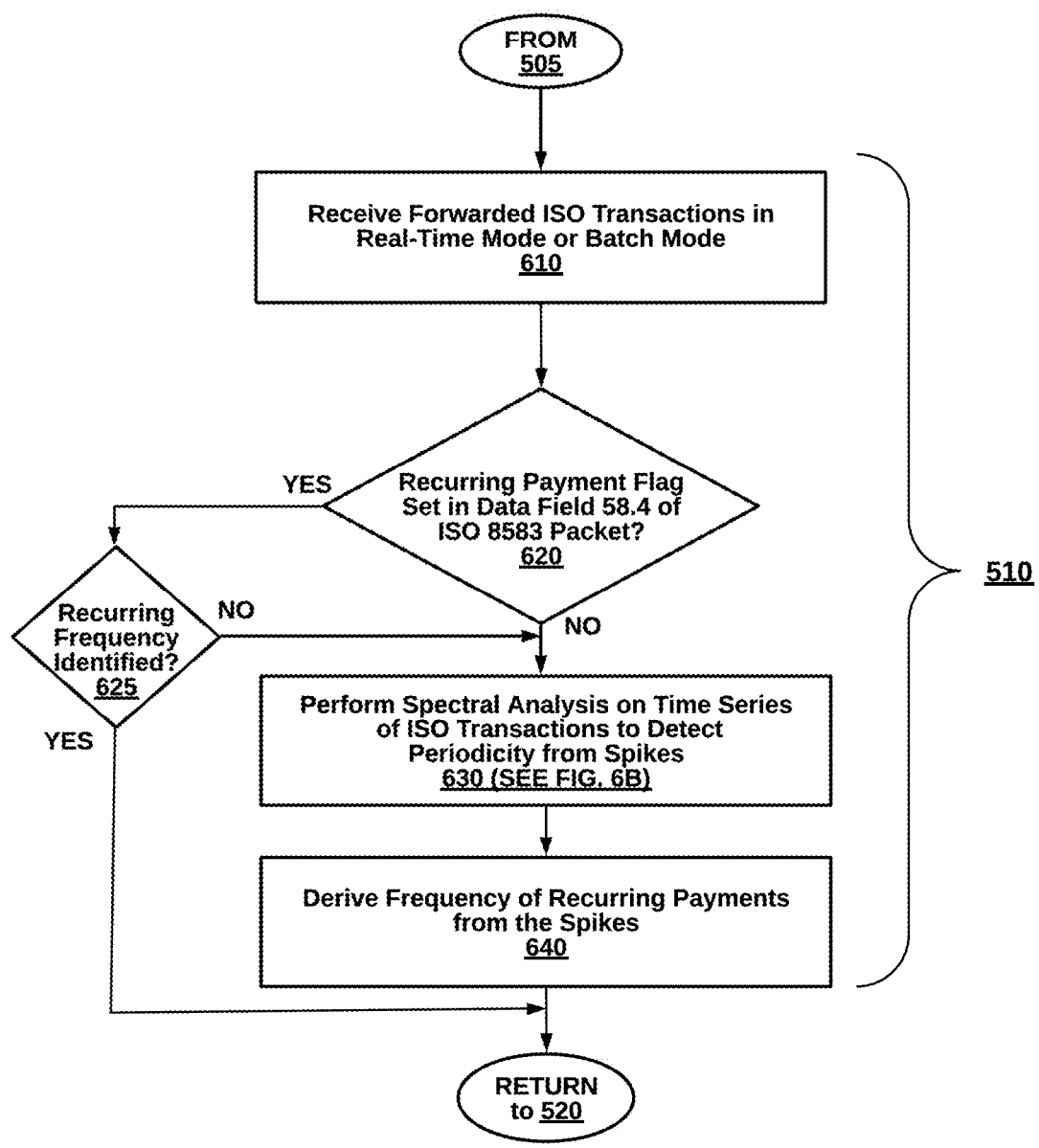
FIG. 6A is a more detailed flow diagram illustrating a step of discovering COF merchants and recurring payments, from the method of FIG. 5, according to an embodiment.

At step 510, COF merchants and recurring payments are discovered, as described in more detail with respect to FIG. 6A. At step 520, a list of COF merchants and recurring payments are provided to card users and/or to a transaction approval system, as shown with further detail in FIG. 7A. If a change to user card data or parameter is detected (e.g., an update to a card for a specific card user is detected) at step 530, at step 540 payment credentials for COF merchants and recurring payments are automatically updated, as described throughout the disclosure.

Recurring payments can be explicitly or implicitly identified. FIG. 6A is a high-level flow diagram illustrating a step of discovering COF merchants and recurring payments, in the method of FIG. 5, according to an embodiment. At step 610, ISO transactions are forwarded in real-time or batch mode for analysis. If a recurring payment flag is set for explicit identification of recurring payments, for example in data field 58.4 of an ISO 8583 format packet at step 620, the merchant is added to the COF merchant list. Another embodiment uses alternative data fields for the recurring data, such as data field 60 and data field 126, depending on whether the transaction is an US transaction or a non-US international transaction. In some embodiments, although the recurring payments are explicit, the frequency is not explicitly identified in step 625. Thus, spectral analysis is performed, at step 630, in order to determine a frequency (e.g., daily, weekly, monthly). Besides spectral analysis, in other embodiments, different transaction attributes are analyzed. If the recurring payment flag is explicitly set at step 620 and frequency is explicitly identified at step 625, the process continues to step 520 for providing the COF merchants and recurring payments list.

In one case, at step 620, if the recurring payment flag is not set, spectral analysis can be performed at step 620 to identify recurring payments in an implicit manner. Next, at step 640, a frequency of recurring payments is derived from the spikes of the spectral analysis. In one embodiment, step 640 is not performed due to poor results in the spectral analysis of step 630, failing to implicitly identify recurring payments. The process then returns to step 520 of FIG. 5.

Figure 6B:
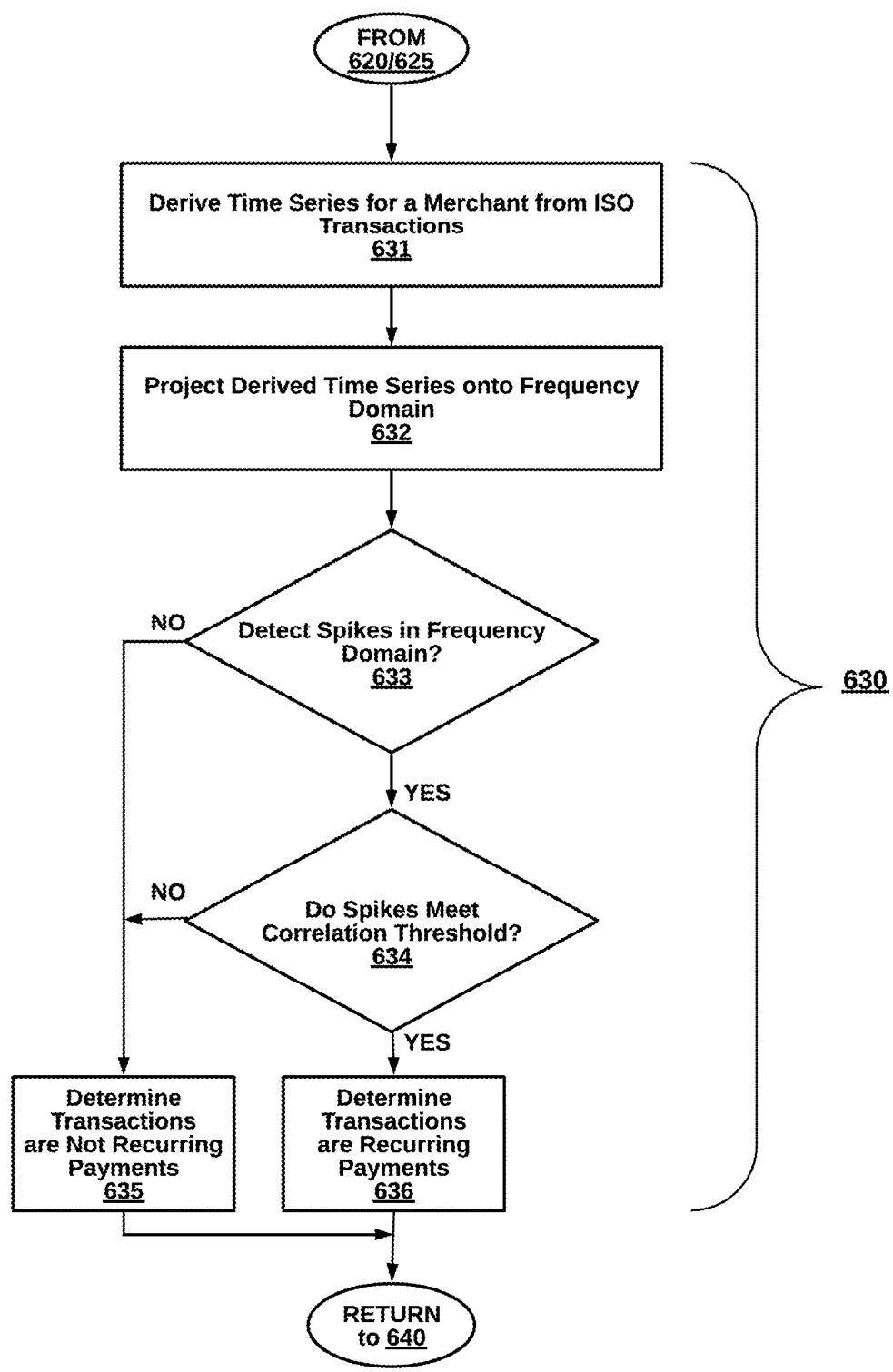
FIG. 6B is a more detailed flow diagram illustrating a step of performing spectral analysis on a time series of ISO transactions to detect periodicity from spikes, from the method of FIG. 6A, according to an embodiment.

The spectral analysis step of 630 is further defined in FIG. 6B. In one embodiment, a time series for a merchant is derived from ISO transactions, in step 631. The derived time series is then projected onto a frequency domain, in step 632. If spikes are detected in step 633 that meet a correlation threshold in step 634, the transactions are determined to be recurring payments in step 656. For example, perfectly sinusoidal data has one spike. Periodic, yet non sinusoidal data has spikes at the integer multiple of the predominant frequency. The multiple spikes are generally caused by spectral leakage due to the imperfect data Otherwise, if there are no spikes in frequency detected at step 633, or the detected spikes of step 633 do not meet the correlation threshold at step 634, it is determined that the time series contains no recurring payments at step 635. For instance, white noise has no spike.

A user can have multiple subscriptions of recurring transactions with a single vendor. The statistical modeling or spectral analysis can be used to detect the available subscription price points for a given merchant, since the transactions at each price point should yield strong recurring pattern at a certain frequency.

The spectral analysis result can be combined with other features derived from transaction data in machine learning models to further fine tune the prediction accuracy. For instance, a machine learning classifier, such as a neural network based classifier or a traditional random forest based classifier, can be used to combine the features including the periodicity and price points from the spectral analysis, the POS entry mode, amount, terminal class (attended or unattended, customer operated or card acceptor operated, on-premise or off-premise), presentation type (card present or card not present, customer present or customer not present), terminal type (home terminal, dial terminal, ecommerce terminal, etc.), payment token types, token device types, and other POS condition codes to predict whether the transaction is a recurring payment or not.

In the case a price point has been detected for recurring payments from the spectral analysis, the price point can be used to alert the user whenever there is an event of price divergence in the same recurring series. In addition, the user's price point can be compared with other similar users for the same merchant at the same city or at the same region, to further inform the users whether or not an anomaly has occurred, and whether or not they should contact the merchant for the difference in charges.

In the case that a spectral analysis does not yield strong recurring pattern for a transaction, which could happen when a given card does not have enough historical transactions on a given merchant, e.g. during the cold start period for a card and merchant, the spectral analysis result (frequency, price point) from other cards on the same merchant can be crowd-sourced as additional features to determine whether this transaction is recurring or not. Such crowd-sourced features can also POS entry mode, terminal class (attended or unattended, customer operated or card acceptor operated, on-premise or off-premise), presentation type (card present or card not present, customer present or customer not present), terminal type (home terminal, dial terminal, ecommerce terminal, etc.), payment token types, token device types, and other POS condition codes.

In some cases, a merchant may send incorrect recurring indicator in the transaction data. For example, Apple iTunes may set the recurring flag for a regular non-recurring eCommerce transaction, regardless of whether the transaction is recurring or not. In such cases, the same model with the same features can be used to detect and correct the incorrect flagging of the transaction. New rules can be automatically generated and implemented.

Figure 7A:
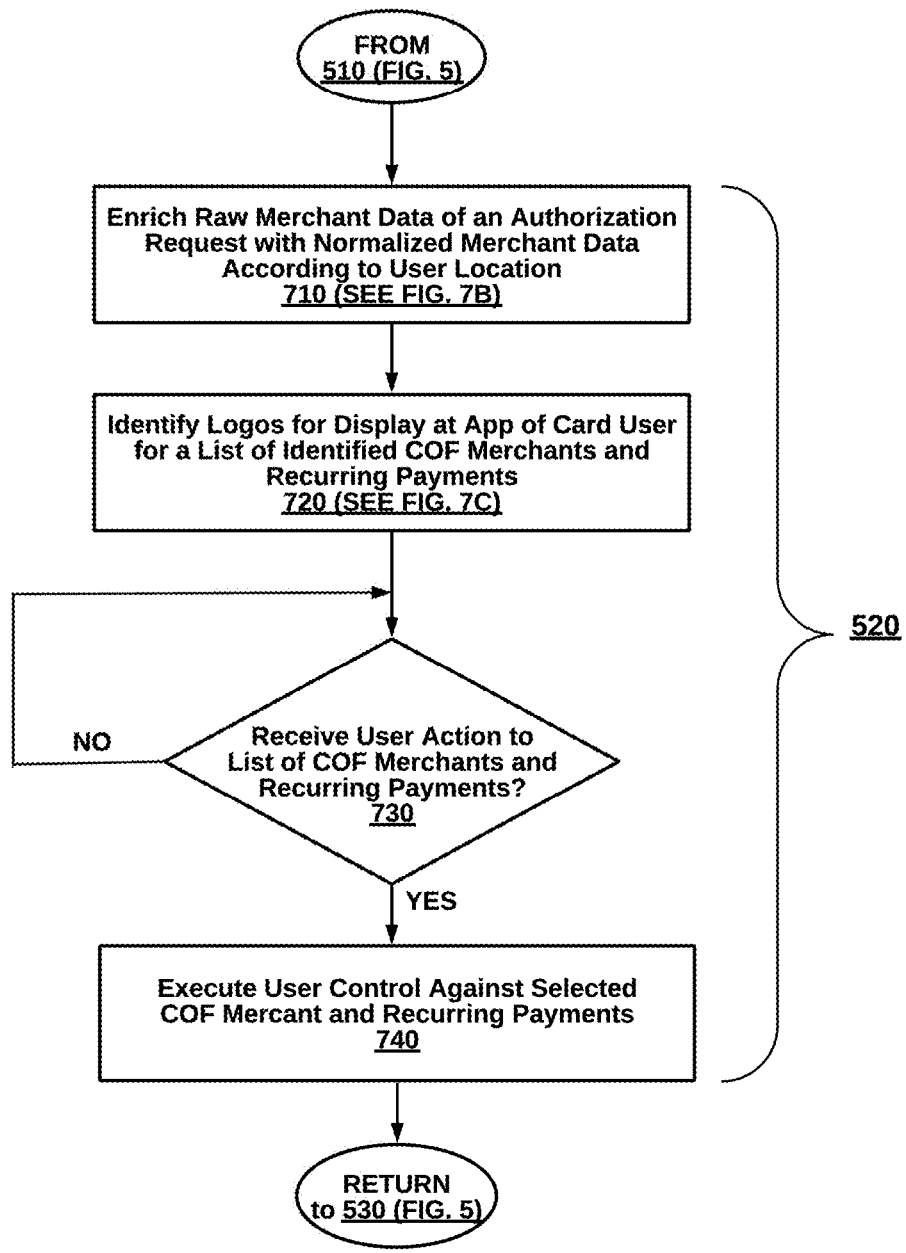
FIG. 7A is a more detailed flow diagram illustrating a step of providing a list of COF merchants and recurring payments to card user and to traditional approval system and users, in the method of FIG. 5, according to an embodiment.

FIG. 7A is a high-level flow diagram illustrating the step 520 of providing a list of COF merchants and recurring payments to card users and to transaction approval system, in the method of FIG. 5, according to an embodiment. At step 710, raw merchant data of an authorization request is enriched with normalized merchant data according to a user location, as set forth below in association with FIG. 7B. The data enrichment can be performed prior to identifying recurring payments, in some embodiments. At step 720, a list of COF merchants and recurring payment is compiled with logos for display at, for example, a mobile app on a smartphone of the card user, as is detailed in FIG. 7C. Preferably, step 720 is performed at a data enrichment server along with step 710. If user actions to list of COF merchants and recurring payments is received at step 730, at step 740, the user control (e.g., cancel, update or limit) is executed against COF merchant and recurring payments. The process returns to step 530 of FIG. 5

Figure 7B:
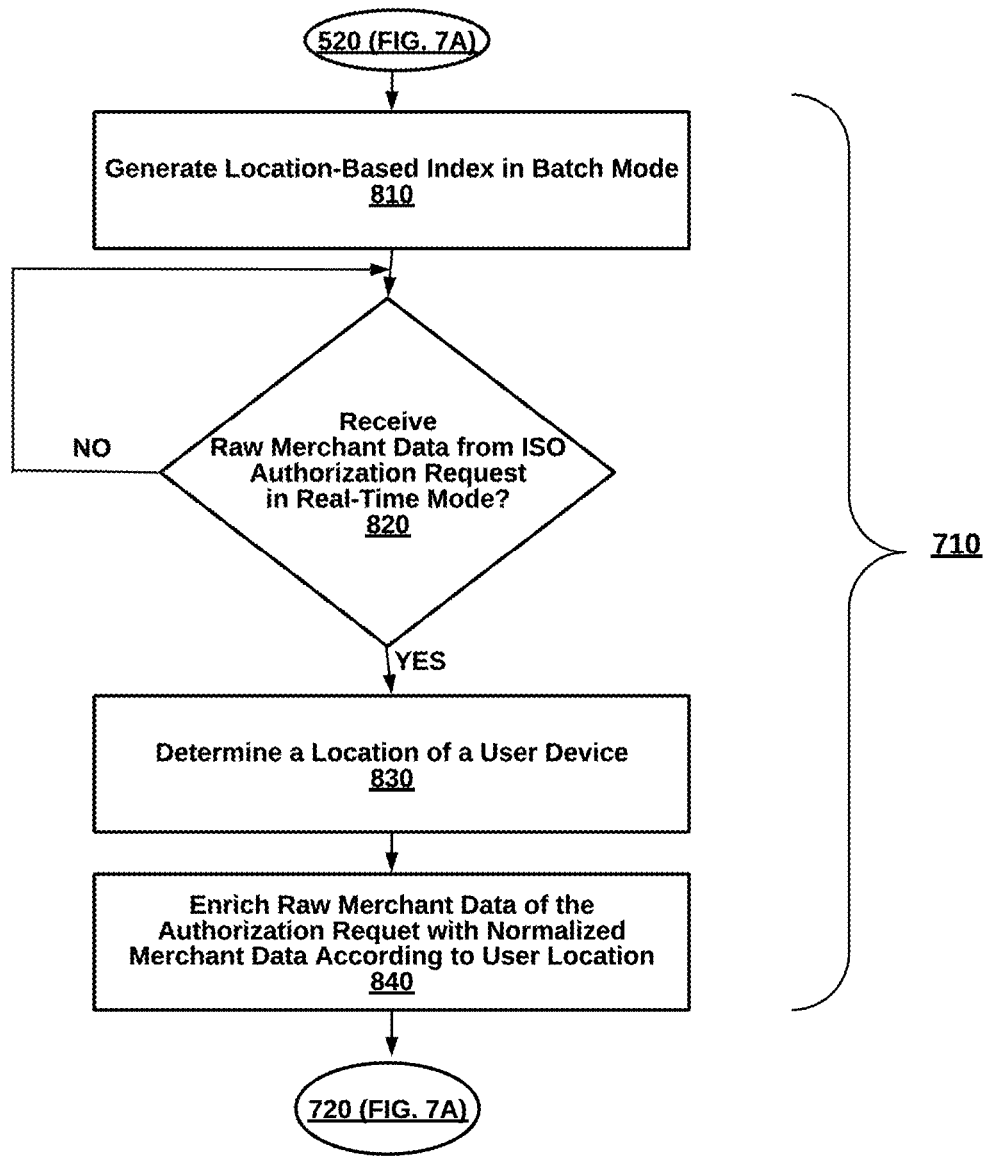
FIG. 7B is a more detailed flow diagram illustrating a step of enriching raw merchant data of an authorization request with normalized merchant data according to user location, in the method of FIG. 7A, according to an embodiment.

FIG. 7B is a more detailed flow diagram illustrating the step 710 of enriching raw merchant data of an authorization request with normalized merchant data according to user location, in the method of FIG. 7A, according to an embodiment.

At step 810, a location-based index is generated in batch mode. At step 820, responsive to receiving raw merchant data parsed from an ISO authorization request for a transaction in process, a location of a user device is determined at step 830. At step 840, raw merchant data is enriched with normalized merchant data according to the user location.

Figure 7C:
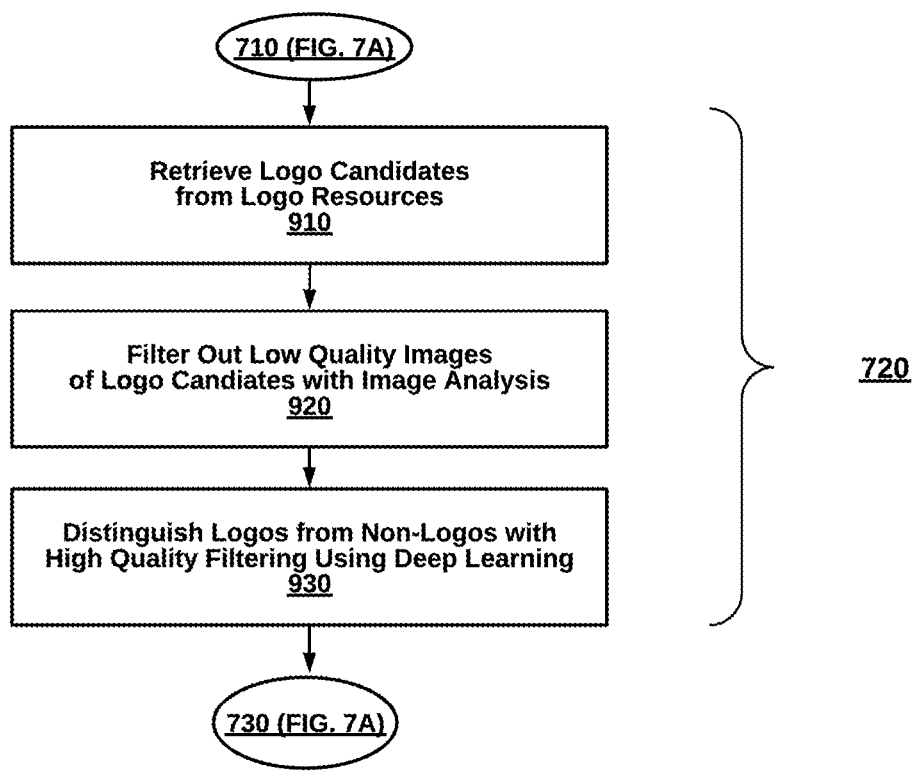
FIG. 7C is a more detailed flow diagram illustrating a step of identifying logos for display at app of card user for a list of identified COF merchants and recurring payments, in the method of FIG. 7A, according to an embodiment.

FIG. 7C is a more detailed flow diagram illustrating the step 720 of identifying logos from enriched raw merchant data, according to an embodiment. At step 910, a set of logo candidates is received from logo resources. At step 920, low quality images are filtered out of logo candidates with image analysis (e.g., resolution, aspect ratio, and entropy ratio). At step 930, logs are distinguished from non-logos with high quality filtering using deep learning (e.g., CNN).

III. Processor-Driven Computing Device (FIG. 8)

Figure 8:
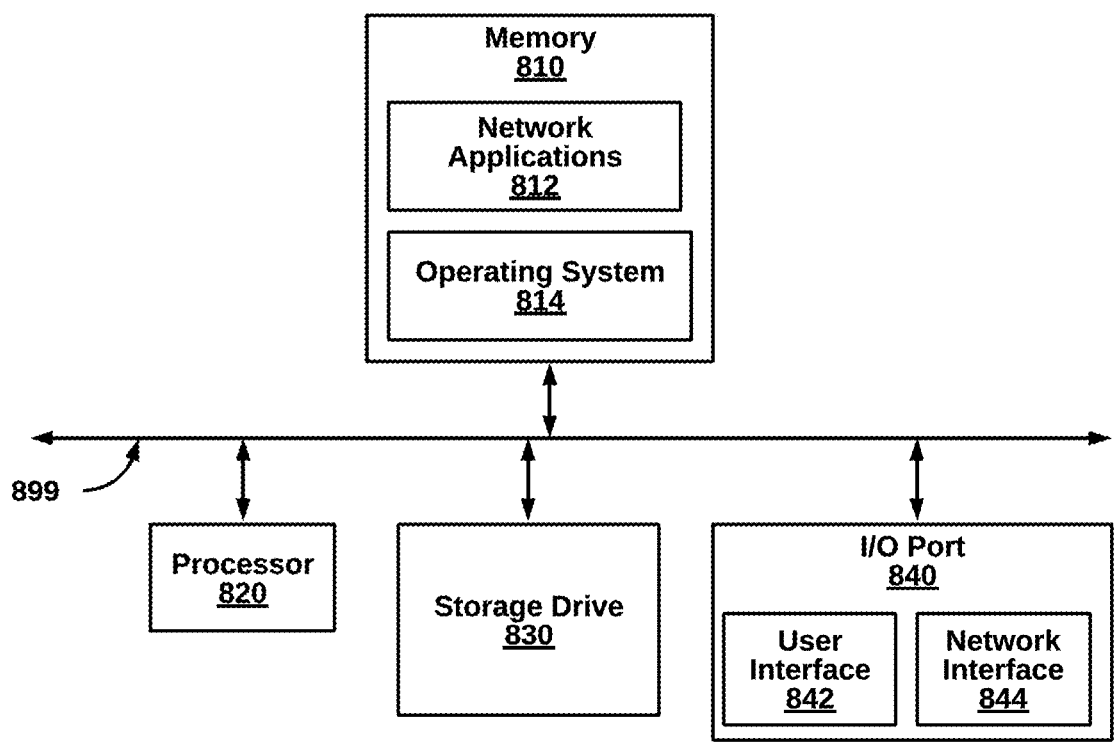
FIG. 8 is a block diagram illustrating an example computing device, according to one embodiment.

FIG. 8 is a block diagram illustrating an exemplary computing device 800 for use in the system 80 of FIG. 1, according to one embodiment. The computing device 800 is an exemplary device that is implementable for the user control server 18, each of the components of ISO transactional system 120, the transaction-initiating device 130, or the account holder device 140. Additionally, the computing device 800 is merely an example implementation itself, since the system 100 can also be fully or partially implemented with laptop computers, tablet computers, smart cell phones, Internet appliances, and the like.

The computing device 800, of the present embodiment, includes a memory 810, a processor 820, a storage drive 830, and an I/O port 840. Each of the components is coupled for electronic communication via a bus 899. Communication can be digital and/or analog, and use any suitable protocol.

The memory 810 further comprises network applications 812 and an operating system 814. The network applications 812 can include a web browser, a mobile application, an application that uses networking, a remote application executing locally, a network protocol application, a network management application, a network routing application, or the like.

The operating system 814 can be one of the Microsoft Windows®. family of operating systems (e.g., Windows 95, 98, Me, Windows NT, Windows 2000, Windows XP, Windows XP x84 Edition, Windows Vista, Windows CE, Windows Mobile, Windows 7, Windows 8, and Windows 8), Android, Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 820 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 88 or the storage device 830.

The storage device 830 can be any non-volatile type of storage such as a magnetic disc, EEPROM, Flash, or the like. The storage device 830 stores code and data for applications.

The I/O port 840 further comprises a user interface 842 and a network interface 844. The account holder interface 842 can output to a display device and receive input from, for example, a keyboard. The network interface 844 connects to a medium such as Ethernet or Wi-Fi for data input and output. In one embodiment, the network interface 844 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network (e.g., using Wi-Fi), or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

We claim:

1. A computer-implemented method in a user control server, implemented at least partially in hardware, for merchant logo detection with artificial intelligence (AI) for improving user control to ISO back-end transaction approvals between acquirer processors and issuer processors over a data communication network, the method comprising:
   receiving a transmission, at a network communication interface coupled to the data communication network, ISO data packets with merchant name;
   transforming raw merchant data from the ISO data packets to enriched merchant data;
   identifying logo candidates for a specific ISO data from external resources based on the enriched merchant data;
   filtering out low quality images of the logo candidates with image analysis including entropy ratio evaluations of the logo candidates;
   processing the logo candidates with high quality filtering including classification of the logo candidates with a deep learning classifier for distinguishing logos from non-logos;
   selecting a logo from the logo candidates to associate with the ISO data packets; and
   generating a display having the selected logo associated with a transaction of the ISO data packets.

2. The computer-implemented method of claim 1, wherein processing the logo candidates with low quality filtering comprises:
   evaluating the logo candidates for aspect ratio;
   evaluating the logo candidates for resolution; and
   evaluating the logo candidates for entropy.

3. The computer-implemented method of claim 1, wherein processing the logo candidates with high quality filtering comprises:
   classifying the logo candidates with Convolutional Neural Network (CNN) for distinguishing logos from non-logos.

4. The computer-implemented method of claim 1, wherein processing the logo candidates with high quality filtering comprises:
   scanning the logo candidates to OCR any text embedded within the logo candidates;
   comparing OCR text against the enriched merchant data for similarity.

5. The computer-implemented method of claim 1, wherein processing the logo candidates with high quality filtering comprises:
   determining image similarity between the logo candidates to known logos, including:
     hashing images of the logo candidates;
     performing a reverse image search based on principal component analysis (PCA) and Approximate Nearest-Neighbor (ANN); and
   flagging for further processing any of the logo candidates that cross a similarity threshold.

6. The computer-implemented method of claim 1, wherein the ISO data packets do not include a merchant logo.

7. The computer-implemented method of claim 1, wherein the non-logo images comprise icons, avatars and memes.

8. The computer-implemented method of claim 1, wherein the deep learning comprises convolutional neural network (CNN) learning.

9. The computer-implemented method of claim 1, wherein the processor establishes a secure channel connection with the mobile account holder device.

10. A non-transitory computer-readable medium comprising source code that, when executed by a processor, performs a computer-implemented method in a user control server for merchant logo detection with artificial intelligence (AI) for improving user control to ISO back-end transaction approvals between acquirer processors and issuer processors over a data communication network, the method comprising:

> receiving a transmission, at a network communication interface coupled to the data communication network, ISO data packets with merchant name;
> transforming raw merchant data from the ISO data packets to enriched merchant data;
> identifying logo candidates for a specific ISO data from external resources based on the enriched merchant data;
> filtering out low quality images of the logo candidates with image analysis including entropy ratio evaluations of the logo candidates;
> processing the logo candidates with high quality filtering including classification of the logo candidates with a deep learning classifier for distinguishing logos from non-logos;
> selecting a logo from the logo candidates to associate with the ISO data packets; and
> generating a display having the selected logo associated with a transaction of the ISO data.

* * * * *